Aug. 23, 1927.

E. BLUM 1,639,978

TACHOMETER

Filed Feb. 3, 1920

WITNESSES
M. Lessin

Inventor
EUGEN BLUM
By his Attorney

Patented Aug. 23, 1927.

1,639,978

UNITED STATES PATENT OFFICE.

EUGEN BLUM, OF VALLEY STREAM, NEW YORK, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

TACHOMETER.

Application filed February 3, 1920. Serial No. 356,004.

Among the principal objects which the present invention has in view are: to increase the range of operation of the apparatus; to provide a system for thoroughly lubricating the moving parts of the apparatus; to condense the size of the apparatus; and to simplify the construction and arrangement of the apparatus.

Drawings.

Figures 1, 2:
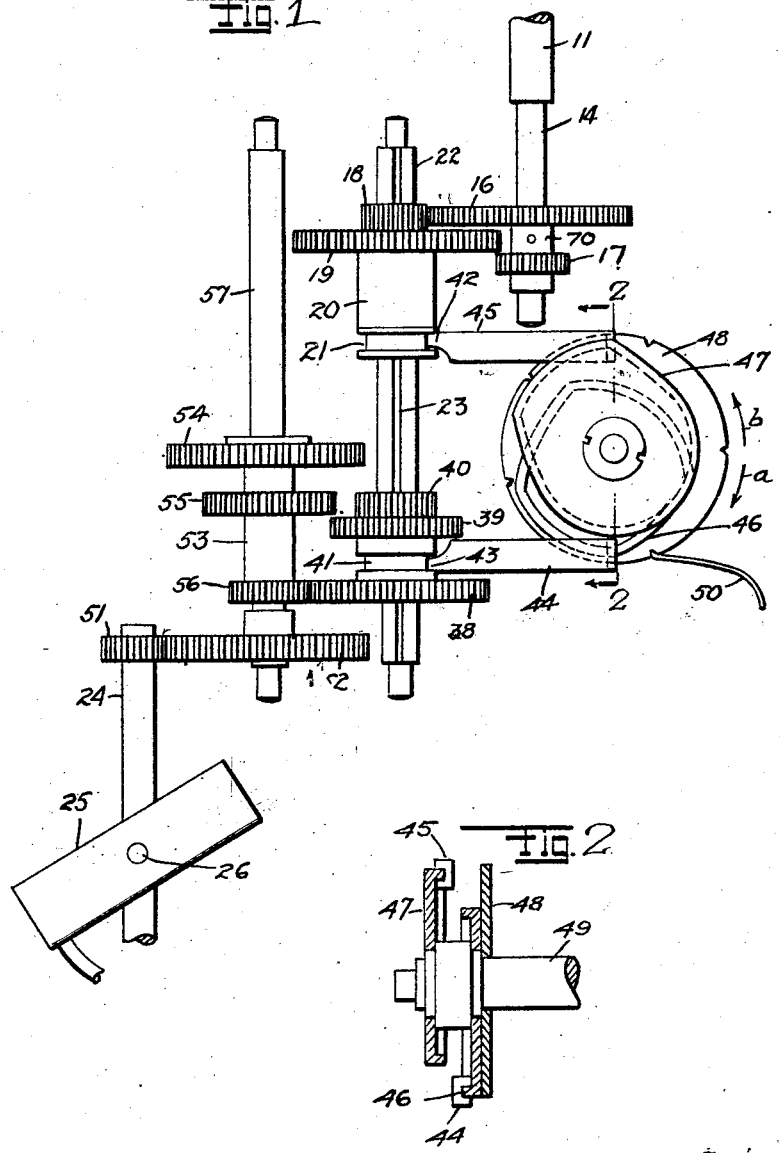
Figure 1 is a detailed view on enlarged scale showing schematically, the arrangement of the transmission gear train and parts associated therewith.
Figure 2 is a cross section of the cam plates for shifting the gears forming said train, section being taken as on the line 2—2 in Fig. 1.

Description.

Referring to the drawings, the tachometer has a spindle 11, which in service, has a head of any suitable type, for engaging a rotary shaft, or other member, at the center thereof.

The spindle 11 carries gear wheels 16 and 17 mounted fixedly on a sleeve 70. The sleeve 70 is pinned to the shaft 14 of the spindle 11. The sleeve 20 has a grooved yoke collar 21. The sleeve 20 is slidably mounted on the free running shaft 22. A spline on the sleeve 20 enters the groove 23 in the shaft 23 to insure the rotation of the shaft with the sleeve and gears mounted thereon when driven by the spindle 11, and the gear wheels thereon.

It will be noted that the gear wheels 18 and 19 correspond in ratio with the gear wheels 16 and 17 and also that the wheels 18 and 19 are so spaced with relation to each other that when the one of said gear wheels is engaged with its corresponding gear wheel on the spindle 11, the other is disengaged. As the ratios of transmission between the gear wheels 16 and 18 and 17 and 19 respectively vary, the ratio of transmission between the spindle 11 and shaft 22 is varied correspondingly.

The purpose in transmitting the rotation through the various gears and intermediary shafts herein described is to vary the relative rotation of the spindle 11 and the governor shaft 24 or shaft whereon is mounted the governor ring 25.

The ring 25 is normally held on the shaft 24 by pivot bearings 26, upon which the said ring swings against spring tension, the function whereof is to normally hold the ring 25 in the inclined position shown in the drawings.

As seen best in Fig. 2 of the drawings, the shaft 22 has mounted thereon, two movable gear sets, the one embodying the gear wheels 18 and 19, and the other embodying gear wheels 38, 39 and 40. The first mentioned gear set is fixedly mounted on the sleeve 20 and has a grooved yoke collar 21. The second mentioned gear set is similarly mounted on a sliding sleeve which has a yoke collar 41.

The collars 21 and 41 are engaged by yokes 42 and 43. The said yokes are at the end of arms 44 and 45. The arms 44 and 45 are operated by the cam plates 46 and 47. The cam plates 46 and 47, and the positioning plate 48 are rigidly attached on the operating shaft 49.

It will be noted that the shaft 24 has mounted thereon a pinion 51 which is constantly engaged by the gear wheel 52 on a tubular jack shaft 53. The tubular shaft 53 has permanently fixed thereon, gear wheels 54, 55, 56. The gear wheels 54, 55 and 56 when operatively engaged mesh with the gear wheels 40, 39 and 38, respectively.

It will also be observed that the gear set embodying the wheels 40, 39 and 38 is arranged so that only one wheel of the said set may engage one of the wheels 54, 55 and 56 at one time. To this end the set is shifted by the arm 44, and the cam plate 46 operating thereon. The wheel 52 is permanently meshed with the pinion 51 and therethrough, transmits to the shaft 24, the rotation imparted by any of the paired gears which may be engaged.

It will be understood that the shaft 24 in its relation to the ring 25 has an established maximum speed and a minimum speed, that is to say, the maximum speed is that which disposes the ring 25 in perpendicular relation to the said shaft 24 or in engaged relation to the stop 33. The minimum speed is that at which the ring 25 begins to move toward the perpendicular relation to the shaft 24.

By reference to Fig. 1 of the drawings it will be seen that when the mechanism is turned clockwise, or in the direction of the arrow "a", shown in said figure, the cams 46 and 47 are rotated with the immediate result that the arm 45, engaging the sleeve 20, is held stationary, while the cam plate is lifted with the gear set engaged thereby. This retains the wheel 18 in engagement with the wheel 16, while the wheel 39 is moved to engage the wheel 55. By the same movement the wheel 38 is carried from engagement with the wheel 56. It is evident that the ratio of transmission from the spindle 11 through the wheel 39 to the wheel 55 is materially reduced for the shaft 24.

If a further reduction is desired, the mechanism is moved in the direction indicated by the arrow "b" which corresponds with a contra-clockwise movement. It will be noted that the cam 46 returns the wheels 38, 39 and 40 to the initial position where the wheel 38 engages the wheel 56, and the wheel 39 is disengaged from the wheel 55. This operation of the cam 46 precedes the action of the cam 47. The operation of the cam 47 is then to lower the plate 45 and the gear set connected therewith until the wheel 18 is disengaged from the wheel 16, and the wheel 19 has engaged the wheel 17.

With this disposition of the gears, the transmission is from the spindle 11 through the wheels 17 to 19; 38 to 56; 52 to 51 and the shaft 24.

It will now be found that the reduction obtained in the transmission is twice the reduction obtained in the initial position. If a further reduction is required, the movement of the disk 35 is continued in the direction indicated by the arrow "b".

The cam 46 now lifts the plate 44 and gear sets carried thereby, while the cam 47 holds the plate 45 inert. This movement of the gear set having the wheels 38, 39 and 40 results in the wheel 38 passing out of engagement with the wheel 56, while the wheel 39 passes into engagement with the wheel 55.

The transmission with the gears in this position is from the spindle 11 through the wheel 17 to the wheel 19, the wheel 39 to the wheel 55, the wheel 52 to the wheel 51, and the shaft 24.

If a further reduction is required, the mechanism is further rotated. During this movement the cam 47 holds the plate 45 and wheels 18 and 19 associated therewith, stationary, while the cam 46 further lifts the plate 44 and the wheels 38, 39 and 40 associated therewith until the wheel 39 passes out of engagement with the wheel 55, and the wheel 40 passes into engagement with the wheel 54. In this position the transmission will be found to be from the spindle 11 through the gear wheels 17 to 19, 40 to 54, 52 to 51 and the shaft 24. The reduction over the previous arrangement is evident.

I claim:

In a tachometer, a driving shaft, a driven shaft, a free running shaft disposed between said shafts, variable transmission members disposed on said free running shaft for longitudinal movement thereon relative to the component members for varying the rate of transmission between the driving and driven shafts, a pair of arms disposed in substantially parallel spaced relation and engaged each at one end with certain of said transmission members for imparting movement thereof on said intermediate shaft upon movement of said arms, a plurality of cams disposed between said arms and in engagement with the opposite ends of said arms, and means for selectively actuating said cams for selective movement of said transmission members through the medium of said arms.

EUGEN BLUM.